United States Patent [19]

Rao et al.

[11] 4,066,824

[45] Jan. 3, 1978

[54] CELL CONTAINING CHALCOGENIDE CATHODE, ALKALI METAL ANODE AND SOLID HALO-ALUMINUM ALKALI METAL COMPOUND ELECTROLYTE

[75] Inventors: Bhaskara M. L. Rao, Fanwood; Bernard G. Silbernagel, Scotch Plains, both of N.J.

[73] Assignee: Exxon Research & Engineering Co., Linden, N.J.

[21] Appl. No.: 756,637

[22] Filed: Jan. 4, 1977

[51] Int. Cl.² ............................................. H01M 10/44
[52] U.S. Cl. ........................................ 429/50; 429/191
[58] Field of Search ................................... 429/191, 50

[56] References Cited

U.S. PATENT DOCUMENTS

| 3,751,298 | 8/1973 | Senderoff | 429/191 X |
|---|---|---|---|
| 3,791,867 | 2/1974 | Broadhead et al. | 429/191 |

*Primary Examiner*—Charles F. LeFevour
*Attorney, Agent, or Firm*—Kenneth P. Glynn

[57] ABSTRACT

A novel electrochemical cell is disclosed utilizing: (a) an anode which contains as the anode-active material an alkali metal; (b) a cathode which contains as the cathode-active material a chalcogenide of the empirical formula $M'Z_n$ wherein $M'$ is one or more metals selected from the group consisting of titanium, zirconium hafnium, niobium, tantalum and vanadium, Z is one or more chalcogens selected from the group consisting of oxygen, sulfur, selenium and tellurium, and $n$ is a numerical value between about 1.8 and about 3.2; and (c) an electrolyte consisting essentially of one or more solid alkali metal aluminum tetrahalide compounds of the formula $MAlX_4$ wherein M is an alkali metal and X is one or more halogens selected from the group consisting of chlorine, bromine and iodine. Preferred is the cell wherein the anode is lithium, the cathode contains as its cathode-active material $TiS_2$, and the electrolyte consists essentially of $LiAlCl_4$.

13 Claims, No Drawings

CELL CONTAINING CHALCOGENIDE CATHODE, ALKALI METAL ANODE AND SOLID HALO-ALUMINUM ALKALI METAL COMPOUND ELECTROLYTE

BACKGROUND OF THE INVENTION

1. Field of the Invention

This invention relates to a novel electric current producing cell. More particularly, this invention relates to improvements in the electric current producing secondary cells of the type comprising an alkali metal anode, a solid electrolyte, and a cathode having metal chalcogenide cathode-active material.

2. Description of the Prior Art

There has been considerable interest in recent years in developing high energy density batteries or voltaic cells. Among the systems being investigated are those employing non-aqueous liquid, fused or solid electrolytes, lightweight metals, such as alkali metals, as anodes, and cathodes containing metal chalcogenide compounds as described, for example, in U.S. Pat. Nos. 3,988,164; 3,925,098, 3,864,167 and 3,791,867.

Various efforts have been made to develop new solid state electrolytes for secondary cell systems. Alkali metal-aluminum-chlorine and alkali metal-aluminum-bromine compounds have been utilized in liquid and molten state electrolyte systems (e.g., as described in U.S. Pat. No. 3,877,984 and U.S. Pat. No. 3,751,298) and solid alkali metal-aluminum-halogen compound electrical conductivity studies have been made (e.g. N. I. Anufrieva et al, *Tseut. Metal.*, Vol. 1, pp 32–36 (1973); W. Weppner et al, *Physics Letters*, Vol. 58A, No. 4, pp 245–248 (1976); and, J. Schoonman et al, *J. Solid State Chem.*, Vol. 1, pp 413–422 (1976)). However, to date, there has been no suggestion that the alkali metal-aluminum-chlorines, bromines and iodines might be useful in solid state electrolyte systems of the type described below.

SUMMARY OF THE INVENTION

A novel electric current-producing cell of the present invention has been developed which contains: (a) an alkali metal-containing anode; (b) a cathode having metal chalcogenide cathode-active material; and (c) a solid electrolyte consisting essentially of an alkali metal-aluminum tetrahalide of chlorine, bromine, iodine or mixtures thereof.

DETAILED DESCRIPTION OF THE INVENTION

A novel electric current-producing cell of the present invention is a solid state cell which contains an anode, a cathode and a solid electrolyte. By "solid state" is meant a cell from which electric current may be drawn at temperatures below the melting point of the electrolyte.

The anode employed in the cell of the present invention is one which contains alkali metal as its active material. Desirably the anode is substantially sodium, potassium, lithium or alloys containing these, and preferably the anode is lithium metal or an alloy of lithium. The anode, e.g., lithium, may be in contact with other metal structures, e.g., nickel, copper or silver screen, which serve as current collectors and are well known in the art.

The cathode used in the cell of the present invention is one which contains as its cathode-active material one or more chalcogenide compounds of the empirical formula:

$$M'Z_n \qquad (1)$$

wherein M' is one or more metals selected from the group consisting of titanium, zirconium, hafnium, niobium, tantalum and vanadium, Z is one or more chalcogens selected from the group consisting of oxygen, sulfur, selenium and tellurium, and $n$ is a numerical value between about 1.8 and about 3.2. Advantageously, M' is one or more metals selected from the group consisting of titanium, niobium, tantalum and vanadium. Preferably, M' is titanium in Formula (1), and the titanium dichalcogenides are preferred. Also Z in Formula (1) is advantageously sulfur. Thus, the metal sulfides are particularly useful. In the most preferred embodiments, M' is titanium and Z is sulfur. Desirably, $n$ is a numerical value between about 1.8 and 2.1, and preferably, between about 1.95 and about 2.02.

The chalcogenides which are used as the cathode-active material may be any of the compounds within the scope of Formula (1) above. Among these are $TiS_2$, $ZrS_2$, $HfS_2$, $NbSe_3$, $TaS_2$, $TaSe_3$, $TaO_{2.5}$ (or $Ta_2O_5$), $VSe_2$, $VO_{2.5}$ (or $V_2O_5$), and the like. Vanadium disulfide is not known but theoretically it should possess a structure of the type found in the other disclosed dichalcogenides and should be similarly electrochemically active. Disulfides of vanadium in combination with other transition metals, such as $V_{0.25}Ti_{0.75}S_{2.0}$, display the requisite electrochemical activity, as do vanadium diselenide and vanadium ditelluride.

The cathode-active material used in the cathode of the cell of the present invention is preferably an intercalatable compound. It should be noted that intercalated chalcogenides are such in the discharged state, and that, in the charged state, the intercalatable chalcogenide contains no intercalated species.

The cathode structure itself need not necessarily consist of the cathode-active material alone but may be a structure such as carbon, nickel, zinc, etc., upon which the chalcogenide is deposited. Preferably, the cathode structure consists entirely of the chalcogenide. The cathode-active material is typically a good electronic conductor and may thus often serve as its own current collector. The cathode-active material may be admixed or diluted with a minor amount of any other electrochemically active material, and alloys (i.e., solid solutions) of the individual chalcogenides may be used as well as the individual chalcogenides. The cathode may be readily fabricated from the individual or alloyed chalcogenides using materials and methods well known in the prior art, e.g., polytetrafluoroethylene bonding agents or support structures such as nickel or copper mesh.

The electrolyte employed in the novel cell of the present invention is a solid electrolyte and consists essentially one or more compounds of the formula:

$$MAlX_4 \qquad (2)$$

wherein M is an alkali metal and X is one or more halogens selected from the group consisting of chlorine, bromine and iodine.

Desirably, the alkali metal M is selected from the group consisting of sodium, lithium and potassium. Preferred is lithium. In general, the compounds encompassed by Formula (2) above include those having more than one type of halogen atom, e.g., dichloro-dibromo compounds, trichloroiodo compounds and the like. However, desirably all four of the halogen atoms are the same, i.e., X is a halogen selected from the group consisting of chlorine, bromine and iodine. Preferably X is chlorine. Among the specific solid electrolyte compounds which are included are: $LiAlCl_4$; $LiAlBr_4$; $LiAlI_4$, $LiAlCl_3Br$; $NaAlCl_4$; $NaAlCl_3Br$; $NaAlBr_4$; $NaAlI_4$; $KAlCl_4$; $KAlCl_3Br$ and the like. The most preferred compound is $LiAlCl_4$.

The electrolyte compound of Formula (2) may be prepared by reacting an alkali metal halide with an aluminum halide, for example, in solution with the hydrogen halide which corresponds to the alkali metal halide. The reaction may proceed at an acceptable rate at room temperature or may be enhanced by heating. Known techniques may be used to concentrate and/or separate the solid compound, as desired. The resulting compound, usually in fine powder form, may be formed into the desired shape by pressing, rolling, binding with polymeric compounds which do not detrimentally affect the electrolytic activity of the compound or may be fused or melted and cooled to form a glassy phase.

The solid state electrolyte is placed between the cathode and the anode in the cell of the present invention to achieve an advantageous electrochemical cell. In one embodiment, the electrolyte is rolled into or pressed into a thin sheet of about 10 mils or less. In another embodiment, the solid electrolyte may be melted and then cooled to form a glassy solid sheet. In any event, the electrolyte consisting essentially of one or more Formula (2) type compounds may be formed into known solid electrolyte configurations for use in the electrochemical cell.

The present invention is illustrated by the following examples, but the invention should not be construed as being limited thereto.

EXAMPLE 1

0.5g of $LiAlCl_4$ powder (melting point 290.3° F) was loaded into 0.5 inch diameter die and pressed to 2000 lbs. ram pressure. Next, 0.2g of $TiS_2$ was added to the die cavity and pressed to 5000 lbs. to form a two layer single pellet. The pellet was then ejected from the die onto the free face of the electrolyte salt, and a 10 mil thick lithium foil of 0.5 inch diameter was placed and mildly pressed to effect lamination, forming a Li/-$LiAlCl_4$/$TiS_2$ cell. The cell was then mounted on a hot plate with the lithium electrode directly facing the heat zone. The electronic circuit was established by making a metallic contact between the Lithium (−) and the $TiS_2$(+) ends of the solid tate galvanic cell, and a 50KΩ load resistor. The open circuit and the closed circuit voltages were measured as a function of temperature of the cell, the latter being measured by a surface thermometer on the hot plate. The cell voltage data given in Table I illustrates the surprisingly good results obtained with the present invention.

TABLE I

Li/$LiAlCl_4$/$TiS_2$ Solid Electrolyte Cell Behavior Load Resistance 50 KΩ

| Temperature (° F) | Current (μA) | Cell EMF on Load (volts) | Open Circuit (volts) |
|---|---|---|---|
| 70 | 20 | 0.19 | 2.62 |
| 120 | 30 | 1.3 | 2.71 |
| 140 | 40 | 1.58 | 2.62 |
| 160 | 40 | 1.84 | 2.62 |
| 180 | 40 | 2.08 | 2.62 |

TABLE I-continued

Li/$LiAlCl_4$/$TiS_2$ Solid Electrolyte Cell Behavior Load Resistance 50 KΩ

| Temperature (° F) | Current (μA) | Cell EMF on Load (volts) | Open Circuit (volts) |
|---|---|---|---|
| 200 | 40 | 2.14 | 2.60 |

EXAMPLE 2

In another experiment, about 0.4 g of $LiAlBr_4$ was used as solid electrolyte, and Li/$LiAlBr_4$/$TiS_2$ cell was assembled by following the procedure described in Example 1. Table II gives the cell voltage data measured across a 50KΩ load using a cell of the present invention.

TABLE II

Li/$LiAlBr_4$/$TiS_2$ Solid Electrolyte Cell Data Temperature

| Temperature (° F) | Current (μA) | Cell EMF on Load (volts) | Open Circuit (volts) |
|---|---|---|---|
| 180 | 20 | 0.55 | 2.88 |
| 220 | 30 | 1.29 | 2.91 |
| 240 | 40 | 1.82 | 2.88 |
| 260 | 50 | 2.12 | 2.94 |
| 280 | 60 | 2.26 | 2.97 |

What is claimed is:

1. A method of operating an electric current-producing cell, comprising: drawing a current from the cell at a temperature below the melting point of the electrolyte of the cell, wherein the cell contains:
    a. an alkali metal-containing anode;
    b. a cathode containing as its cathode-active material, one or more chalcogenides of the empirical formula:

$M'Z_n$ wherein M' is one or more metals selected from the group consisting of titanium, zirconium, hafnium, niobium, tantalum and vanadium, wherein Z is one or more chalcogens selected from the group consisting of oxygen, sulfur, selenium and tellurium, and wherein n is a numerical value between about 1.8 and about 3.2; and
    c. a solid electrolyte consisting essentially of one or more compounds of the formula:

$MAlX_4$ wherein M is an alkali metal and X is one or more halogens selected from the group consisting of chlorine, bromine and iodine.

2. The method of claim 1 wherein the anode is substantially sodium, lithium, potassium, or alloys containing these, wherein M' is one or more metals selected from the group consisting of titanium, niobium, tantalum and vanadium, wherein Z is sulfur, and wherein M is selected from the group consisting of sodium, lithium and potassium.

3. The method of claim 2 wherein the anode is substantially lithium or a lithium alloy and wherein M is lithium.

4. The method of claim 3 wherein the cathode-active material is titanium disulfide, and wherein the solid electrolyte consists essentially of $LiAlCl_4$.

5. An electric current-producing cell from which a current may be drawn at a temperature below the melting point of the electrolyte, comprising:
   a. an alkali metal-containing anode;
   b. a cathode containing as its cathode-active material, one or more chalcogenides of the empirical formula:

$$M'Z_n$$

wherein M' is one or more metals selected from the group consisting of titanium, zirconium, hafnium, niobium, tantalum and vanadium, wherein Z is one or more chalcogens selected from the group consisting of oxygen, sulfur, selenium and tellurium, and wherein n is a numerical value between about 1.8 and about 3.2; and
   c. a solid electrolyte consisting essentially of one or more compounds of the formula:

$$MAlX_4$$

wherein M is an alkali metal and X is one or more halogens selected from the group consisting of chlorine, bromine and iodine.

6. The cell of claim 5 wherein the anode is substantially sodium, lithium, potassium or alloys containing these, and M' is one or more metals selected from the group consisting of titanium, niobium, tantalum and vanadium.

7. The cell of claim 6 wherein M in the electrolyte formula is selected from the group consisting of sodium, lithium and potassium.

8. The cell of claim 7 wherein X is chlorine.

9. The cell of claim 8 wherein M' is titanium, Z is sulfur and n is a numerical value between about 1.8 and about 2.1

10. The cell of claim 9 wherein the anode is substantially lithium or a lithium alloy.

11. The cell of claim 10 wherein M is lithium.

12. An electric current-producing cell from which a current may be drawn at a temperature below the melting point of the electrolyte, comprising:
   a. a lithium metal-containing anode;
   b. a cathode containing titanium disulfide as the cathode-active material; and
   c. a solid electrolyte consisting essentially of $LiAlCl_4$.

13. The cell of claim 12 wherein the solid electrolyte has been melted and cooled to form a glassy phase.